US005841038A

United States Patent [19]

Volz

[11] Patent Number: 5,841,038

[45] Date of Patent: Nov. 24, 1998

[54] REMOTE POSSIBLY HAZARDOUS CONTENT CONTAINER SAMPLING DEVICE

[76] Inventor: David L. Volz, 59 La Paloma, Los Alamos, N. Mex. 87544

[21] Appl. No.: 724,117

[22] Filed: Sep. 30, 1996

[51] Int. Cl.$^{6}$ .......... G01N 1/14

[52] U.S. Cl. .......... 73/863.85; 73/864.31

[58] Field of Search .......... 73/863.81–863.86, 73/864.31, 864.33, 864.74

[56] References Cited

U.S. PATENT DOCUMENTS

| | | | |
|---|---|---|---|
| 2,006,301 | 6/1935 | Meyer | 73/864.31 X |
| 2,215,594 | 9/1940 | Parsons | 73/863.82 X |
| 2,255,369 | 9/1941 | Spaeth | 73/864.31 X |
| 2,261,457 | 11/1941 | Wiggins | 73/864.31 X |
| 3,084,553 | 4/1963 | Cullinan et al. | 73/864.31 |
| 3,933,186 | 1/1976 | Scheffler | 141/97 |
| 4,213,342 | 7/1980 | Gates . | |
| 5,035,269 | 7/1991 | Pytryga et al. | 141/1 |
| 5,261,150 | 11/1993 | Grube et al. | 29/560 |
| 5,273,088 | 12/1993 | Cripe et al. | 141/329 |
| 5,339,876 | 8/1994 | Mattern | 141/51 |
| 5,349,755 | 9/1994 | Haywood | 30/443 |
| 5,370,268 | 12/1994 | Adams | 222/1 |
| 5,383,499 | 1/1995 | Mattern | 141/51 |
| 5,499,665 | 3/1996 | Gold et al. | 141/1 |

FOREIGN PATENT DOCUMENTS

| | | | |
|---|---|---|---|
| 516939 | 6/1976 | U.S.S.R. | 73/863.85 |
| 798529 | 1/1981 | U.S.S.R. | 73/863.85 |

*Primary Examiner*—Thomas P. Noland
*Attorney, Agent, or Firm*—Kevin Lynn Wildenstein, Esq.

[57] ABSTRACT

The present invention relates to an apparatus capable of sampling enclosed containers, where the contents of the container is unknown. The invention includes a compressed air device capable of supplying air pressure, device for controlling the amount of air pressure applied, a pneumatic valve, a sampling device having a hollow, sampling insertion needle suspended therein and device to communicate fluid flow between the container and a containment vessel, pump or direct reading instrument.

10 Claims, 5 Drawing Sheets

REMOTE POSSIBLY HAZARDOUS CONTENT CONTAINER SAMPLING DEVICE

FIELD OF THE INVENTION

The remote sampling container apparatus of present invention relates to a apparatus capable of opening, sampling and venting enclosed containers, where the contents of the container are unknown, under pressure or shock sensitive. The invention includes an compressed air means capable of supplying and regulating air pressure, a sampling device having a hollow, sampling insertion needle suspended therein and means to communicate fluid flow between the container and a containment vessel, pump or direct reading instruments.

BACKGROUND OF THE INVENTION

In the field of hazardous material handling, it is often necessary to open containers which contain potentially hazardous material. For example, hazardous material teams may come upon a container, such as a barrel container, where the contents therein are unknown. This occurs frequently at defense sites, national laboratories, dump sites or industrial buildings where such containers were previously discarded or abandoned (often in locations accessible to the public). The container's contents are usually unknown, and even if the container is labeled, it may have been previously emptied of its original contents and refilled with hazardous materials.

While the contents of the container may be nonvolatile, there is no easy way to determine the container's volatility without first opening the container. The container may also be brittle due to corrosion from either years of exposure to its immediate environment or due to corrosion from the chemical content therein. Finally, the contents of the container may have chemically changed over time, resulting in material that is now hazardous. Therefore, individuals having to deal with hazardous material are concerned with handling the containers if the contents within the container are volatile, or present a hazard to humans (such as might occur if the container holds radioactive contamination, abundant asbestos or lead contaminated soil).

As such, hazardous material team members must first identify the contents of the container in order to determine how to handle and properly dispose of the material. Containers holding hazardous materials cannot be left in the environment because of the potential leakage of the contents into the immediate environment. Further, it may be desirable to first determine the container's content before removing the container to another location for chemical testing.

Prior art devices capable of puncturing containers exist. For example, U.S. Pat. No. 5,349,755 to Haywood discloses a device capable of opening a drum which is clamped on one end of the drum by a frame mechanism. Haywood discloses a device for puncturing one end of a conventional oil drum by use of a hydraulic mechanism. Haywood's invention, however is deficient for use in the hazardous materials industry for several reasons. First, Haywood requires that his invention be attached to one end of the drum. In many instances, hazardous material members confront containers which have fallen over, or containers which are partially enclosed within the ground. In these instances, hazardous material team members are leery of moving the container, since the container could be pressurized and, if moved, the container could explode due to the pressure built up within the container. Therefore, if both ends of a container are partially encapsulated by the surrounding ground, Haywood's invention would not work without first moving the drum. Second, Haywood's invention is directed solely to opening a drum, and therefore, cannot determine the contents therein, nor can it pump the material out of the drum. Additionally, Haywood's invention cannot open those drums which have changed shape due to the internal pressure built up within the drum (e.g., a football-shaped drum) without presenting serious risk to or threatening the life of the operator. Haywood's disclosure also allows any hazardous material or gas to immediately escape once the drum is punctured. Finally, Haywood requires the operator to personally sample the contents within the drum, without regard to the dangerous nature of the contents therein.

The present invention opens or punctures various sized and shaped containers in a safe and efficient manner, without significant human contact with the container. The present invention is capable of being remotely operated to prevent any hazardous explosion or spill from occurring, thereby mitigating or completely eliminating destruction of life and/or property.

The present invention provides a unique and novel approach to opening containers where the contents of the containers are unknown and need to be determined prior to opening the container. The present invention is adapted to open various sized and shaped containers, and is further designed to be remotely operated from a distance for safety purposes.

In view of the foregoing, it is an object of the present invention to provide a device capable of opening, sampling and venting enclosed containers, where the contents of the container are unknown.

It is also an object of the invention to provide a device capable of in-situ opening, sampling and venting containers of various size and shape.

It is also an object of the invention to provide a light weight, inexpensive device which, opens, samples and vents containers of various size and shape, without having to move such container.

It is a further object of the invention to remotely open, sample and/or vent enclosed containers, thereby diminishing or completely eliminating injury to a person and/or to the immediate environment.

SUMMARY OF THE INVENTION

In the preferred embodiment, the present invention includes a remotely located compressed air means capable of communicating with an air cylinder and a sampling device. The sampling device incorporates the air cylinder which has an internal piston (or pneumatic ram) whose movement is controlled by the compressed air means and which is attached to a hollow needle capable of puncturing a container, such as a drum, bottle closure or the like. A sealable chamber is also provided with the sampling device to prevent spills or escapes of material from the container as it is punctured. Finally, an optional shaft position switch is provided so that the operator of the present invention, without approaching or being near the container, can determine if the container has been penetrated.

In operation, the sampling device is attached to any point on the container. From a remote location, air is supplied from the compressed air means to the pneumatic ram to cause the hollow needle to penetrate the container's surface. The needle is preferably hollow and of sufficient length to thereby allow the needle to both puncture the container and also enter the container, to either withdraw the contents therein, or to introduce another substance (such as a chemical neutralizer). A means for communicating is attached between the remotely located compressed air means and a containment vessel, pump or direct reading instrument can be hollow tubing. The hollow tubing is in fluid communication with the hollow needle to thereby remove the container's contents (via a remotely located vacuum pump), or to convey material into the container (via a remotely located chemical or gas container). An inert gas from a remotely located inert gas tank can be introduced into the immediate area where the needle punctures the container, or through the hollow needle and into the container to thereby minimize any explosion when the container is punctured.

In another embodiment, the present invention opens, samples and vents enclosed small containers (such as small metal containers or glass containers having plastic stoppers or tops) smaller than conventional oil drums. Such small containers are placed on an adjustable table within a support frame on which the pneumatic ram is mounted. The small container is positioned and adjusted underneath the hollow needle so that the hollow needle punctures the top of the small container.

DESCRIPTION OF THE PREFERRED EMBODIMENT

The remote sampling container device 10 of the present invention includes three major components: (a) a remotely located compressed air means 11; (b) sampling device 21; and (c) means for communicating fluid flow 25 between the compressed air means and a containment vessel, pump or direct reading instrument.

Figure 1:
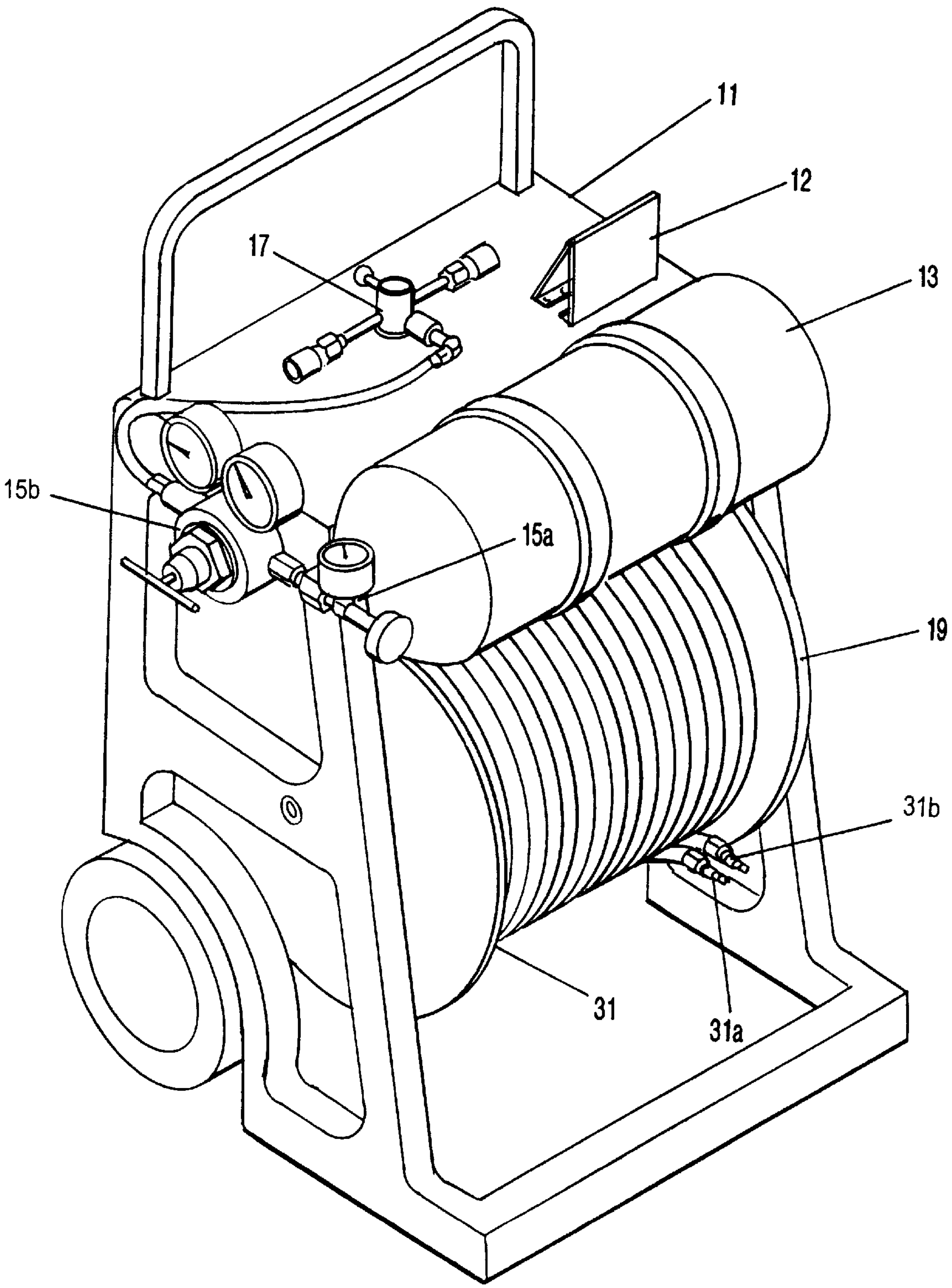
FIG. 1 illustrates the compressed air means attached with the air line and optional computer according to the present invention.
Figure 2:
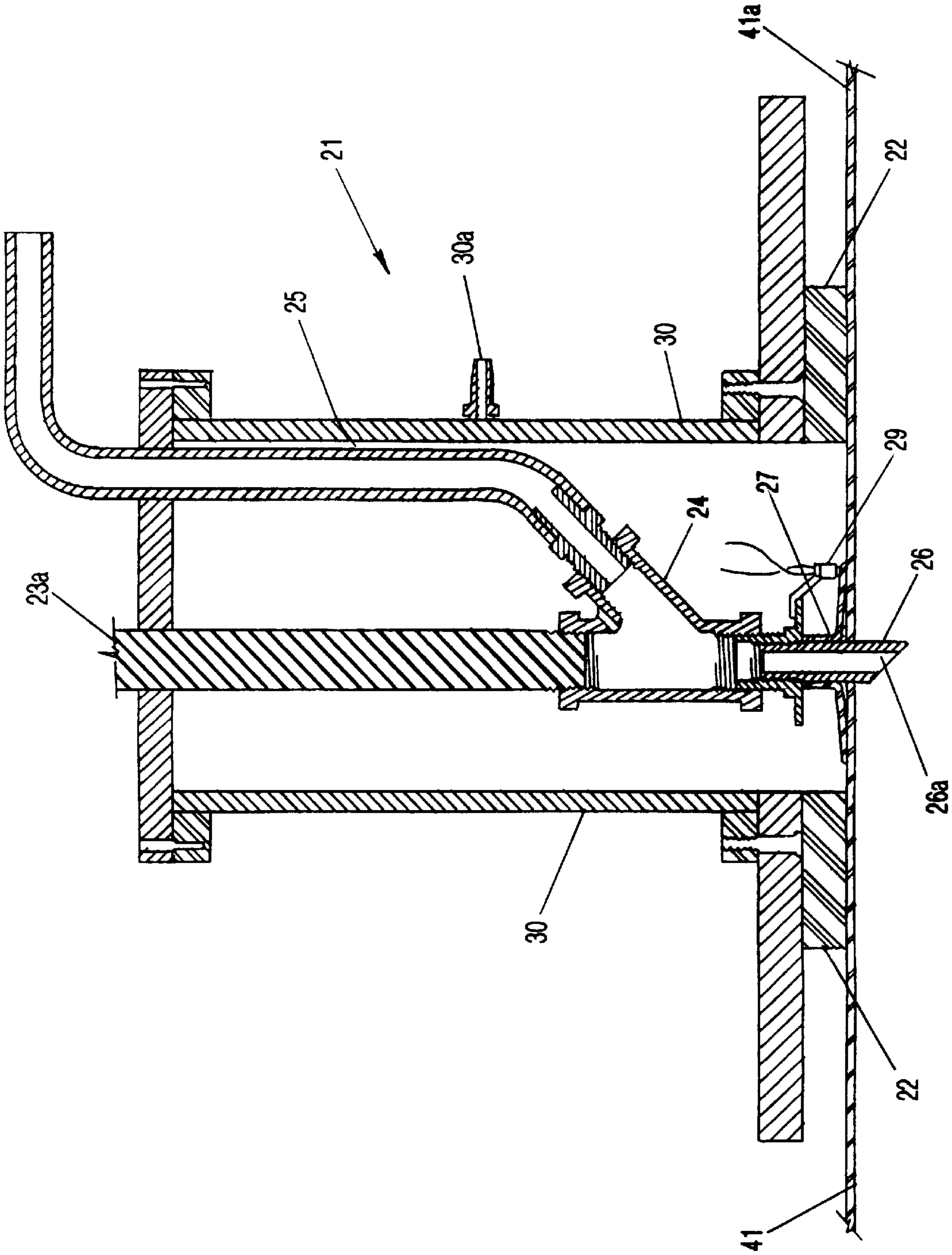
FIG. 2 is a side cross sectional view of the sampling device of the present invention.
Figure 3:
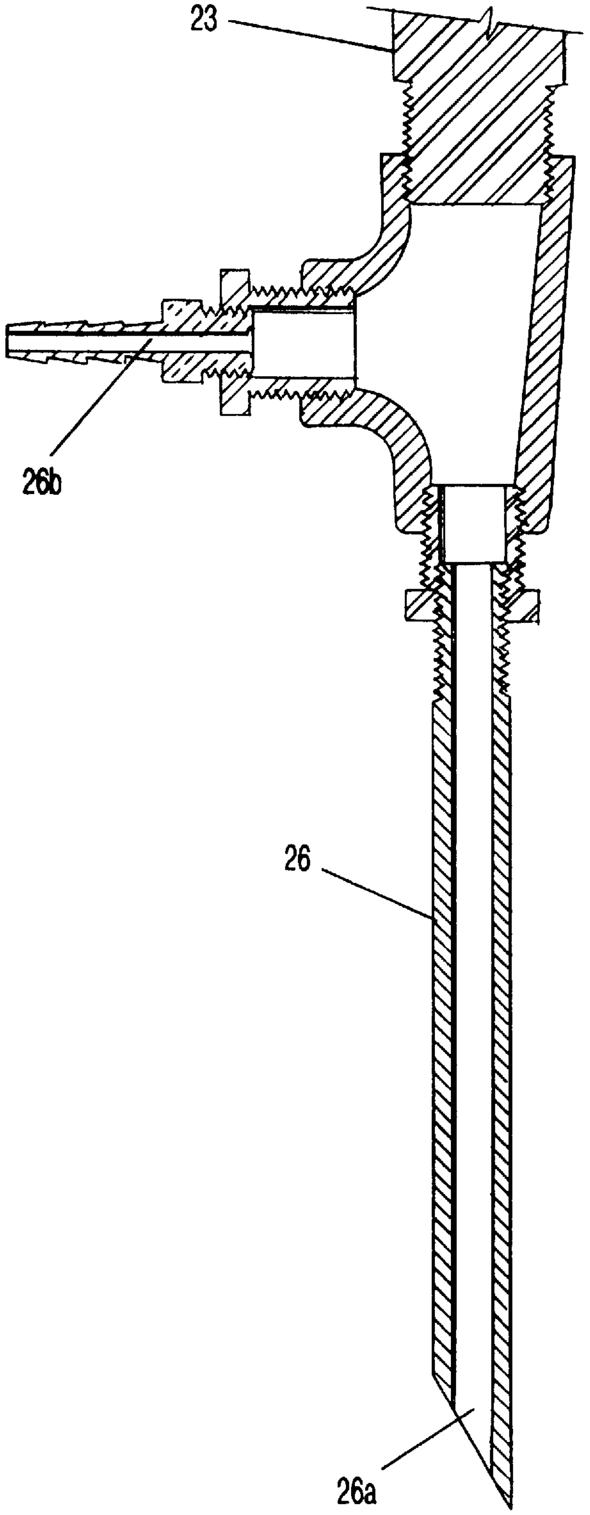
FIG. 3 is an exploded view of the hollow needle according to the present invention, as seen in FIG. 2.

One embodiment of the present invention is depicted in FIGS. 1–4. With reference to FIG. 1, remotely located compressed air means 11 is depicted. Compressed air means 11 includes compressed air pressure tank 13 for supplying air pressure, tank gauge valve 15*a*, pressure regulator 15*b*, control valve 17, reel 19 and penetration indicator 12. Pressure regulator 15*b* controls the amount of force (air pressure) applied to pneumatic ram 23 of sampling device 21 (as seen in FIG. 2). Control valve 17 also controls the amount of air with which to extend sampling device's pneumatic ram 23 (as seen in FIG. 2). In an embodiment of the present invention, control valve 17 has two different open positions. The first position allows for extending pneumatic ram 23, and the second position allows for retracting pneumatic ram 23. Optionally, control valve 17 has a neutral position in which no air pressure is fed through to control pneumatic ram 23. With such valves, this is a mechanical method for controlling pneumatic ram 23, however, those skilled in the art will realize that the means to accomplish control of pneumatic ram 23 can include computer controlled means in communication with air pressure tank 13.

With reference to FIG. 2, sampling device 21 includes a hollow sampling needle 26, pneumatic ram shaft 23 and elongated fluid flow attachment means 25. Hollow sampling needle 26 is preferably an elongated pipe having a tapered open end 26*a*, is made of a metal alloy and is sharpened for puncturing various types of containers, including steel or plastic containers. By being in fluid communication with means for communicating fluid flow 25 (as seen in FIG. 2), hollow needle 26, along with gasket seal 27 and rubber seal 22, allows pressure built up within container 41 to have a directed venting path, thereby preventing any escape of the material into the immediate environment surrounding container 41. As those of skill in the art will appreciate, the directed venting path can flow to a remote external container or like containment system to prevent escape into the environment.

Figure 4:
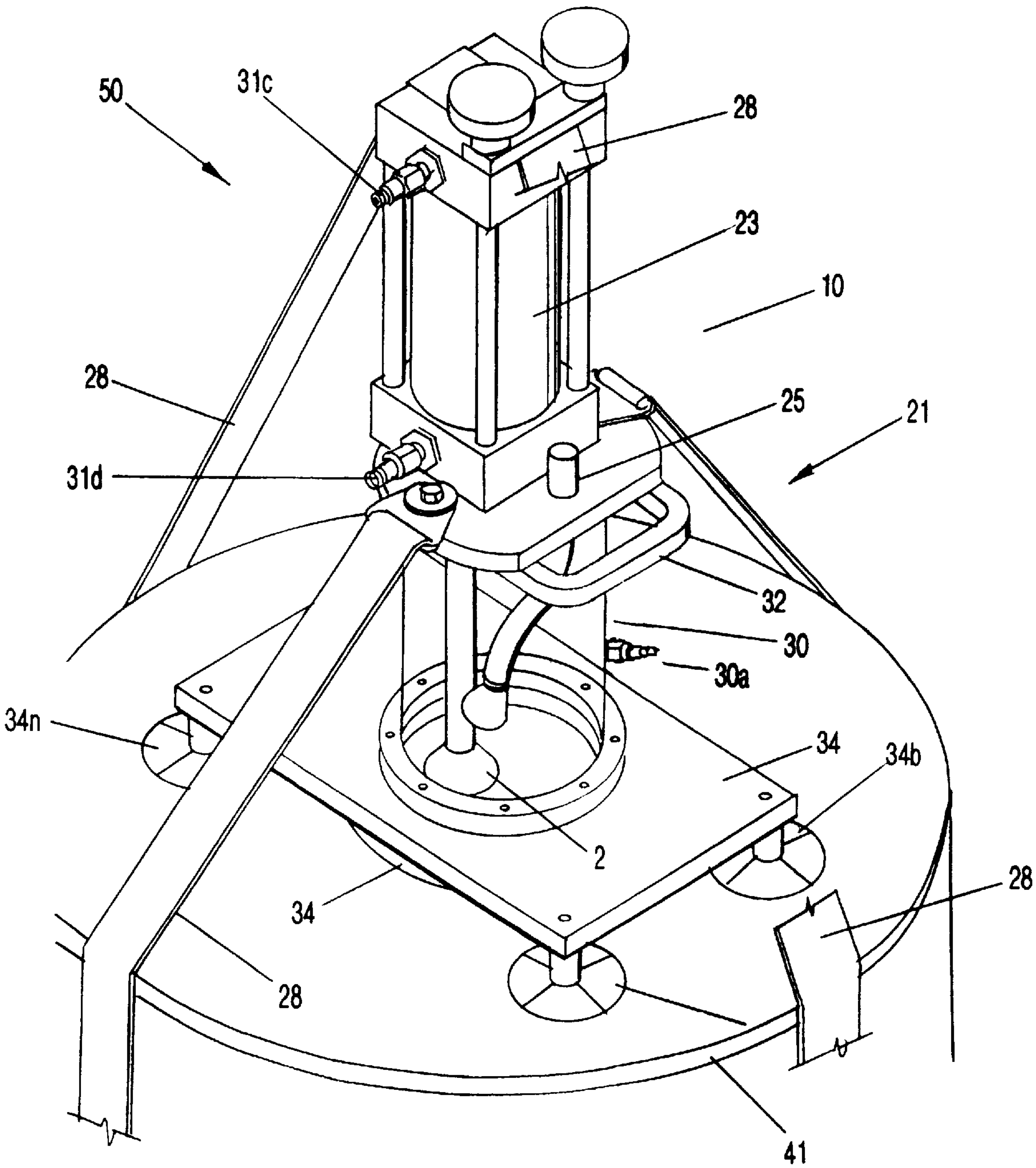
FIG. 4 is an side perspective view of FIG. 2, depicting the sampling device placed upon a container.

As described above, sampling device 21 includes gasket seal 27 and rubber seal 22, as well as switch 29 and fitting 24. Gasket seal 27 is preferably a rigid, flexible material, and is adapted to prevent liquid and excess vapors emitted from an open container from escaping. As those of skill in the art will come to appreciate, a predetermined location and size of gasket seal 27 also acts to allow hollow needle 26 to enter container 41 a predetermined depth. Securing means 28 (such as holding straps as shown in FIG. 4) provide adequate pressure against rubber seal 22, thereby advancing a firm, yet secure, contact between seal 22 and container surface 41*a*. A clear tube 30 (such as formed from polycarbonate material) is attached to pneumatic ram 23 and serves as a secondary containment system should any hazardous material bypass gasket seal 27, and further allows for safe observation of the sampling device during operation. Clear tube 30 also provides a containment volume for an inert gas introduced through fitting 30*a* to reduce the possibility of the ignition of any flammable or explosive contents of container 41. Rubber seal 22 is preferably made from foam rubber or similar material which is resistant to permeation from escaping chemical vapors.

Base 34 (as seen in FIG. 4) also can be attached to clear tube 30 to provide a proper foundation for sampling device 21, and can include a plurality of adjustable feet 34*a*–$\mathbf{34}_n$ to help stabilize device 21 when used on variable sized containers. Fitting 24, as seen in FIG. 2, can be y-shaped or any angle appropriate for a particular embodiment of the present invention. In any design of fitting 24, it must allow for facile external fluid communication with hollow needle 26.

When in use, compressed air means 11 is connected through high pressure air line 31 and first quick disconnect 31*a* and second quick disconnect 31*b* (FIG. 1) to disconnects 31*c*, 31*d* on pneumatic ram 23 (FIG. 4) for controlling shaft 23*a*. Additionally, an inert gas con be introduced into clear tube 30 through fitting 30*a* when the contents of container 41 are unknown or known to be flammable or explosive.

When not in use, remote compressed air means 11 is easily transported upon the same vehicle used to transport sampling device 21. Preferably, conventional air hose reel 19 is used to hold a predetermined length of high pressure air line 31, and is adapted to quickly reel or unreel, should it become necessary, during emergency operation.

Preferably, clear tube 30 is filled with an inert gas through fitting 30*a* from a remotely located inert gas tank. The inert gas also could flow through the means for communicating fluid flow 25 to the hollow portion of the insertion needle 26 so that the immediate area where container 41 is punctured will be flooded with inert gas. In this fashion, an extreme explosion will be prevented or significantly reduced.

Further, hollow insertion needle 26 can be used to introduce chemical neutralizers to the interior of container 41, if necessary.

Penetration indicator 12, as seen in FIG. 2, is preferably a volt meter (not shown) attached in serial to switch 29 on sampling device 21. Switch 29 on sampling device 21 is by default set to an open position. When hollow needle 26 is fully extended into a container being sampled (such as container 41 in FIG. 2), switch 29 contacts container surface 41*a* and moves to a closed position, thereby completing an electrical path between itself and penetration indicator 12. In this fashion, penetration indicator 12 notifies the operator when hollow needle 26 is adequately or fully extended into open container 41.

When the preferred embodiment is in use, sampling device 21 is attached to container 41 (for example, an oil drum) by attaching securing means 28 (such as straps 28 as seen in FIG. 4) to the container. The operator then attaches high pressure air line 31 to pneumatic ram 23 at quick disconnects 31*c*, 31*d*, and, while moving to a safe distance, extends high pressure air line 31 to a remote location. High pressure air line 31 is then attached to compressed air means 11. By controlling pneumatic ram 23 through control valve 17 and regulator 15*a*, an operator can remotely control the operation of pneumatic ram 23 and hollow needle 26 as it punctures container 41. The container does not need to be moved, and the operation can be conducted from a safe distance.

Figure 5:
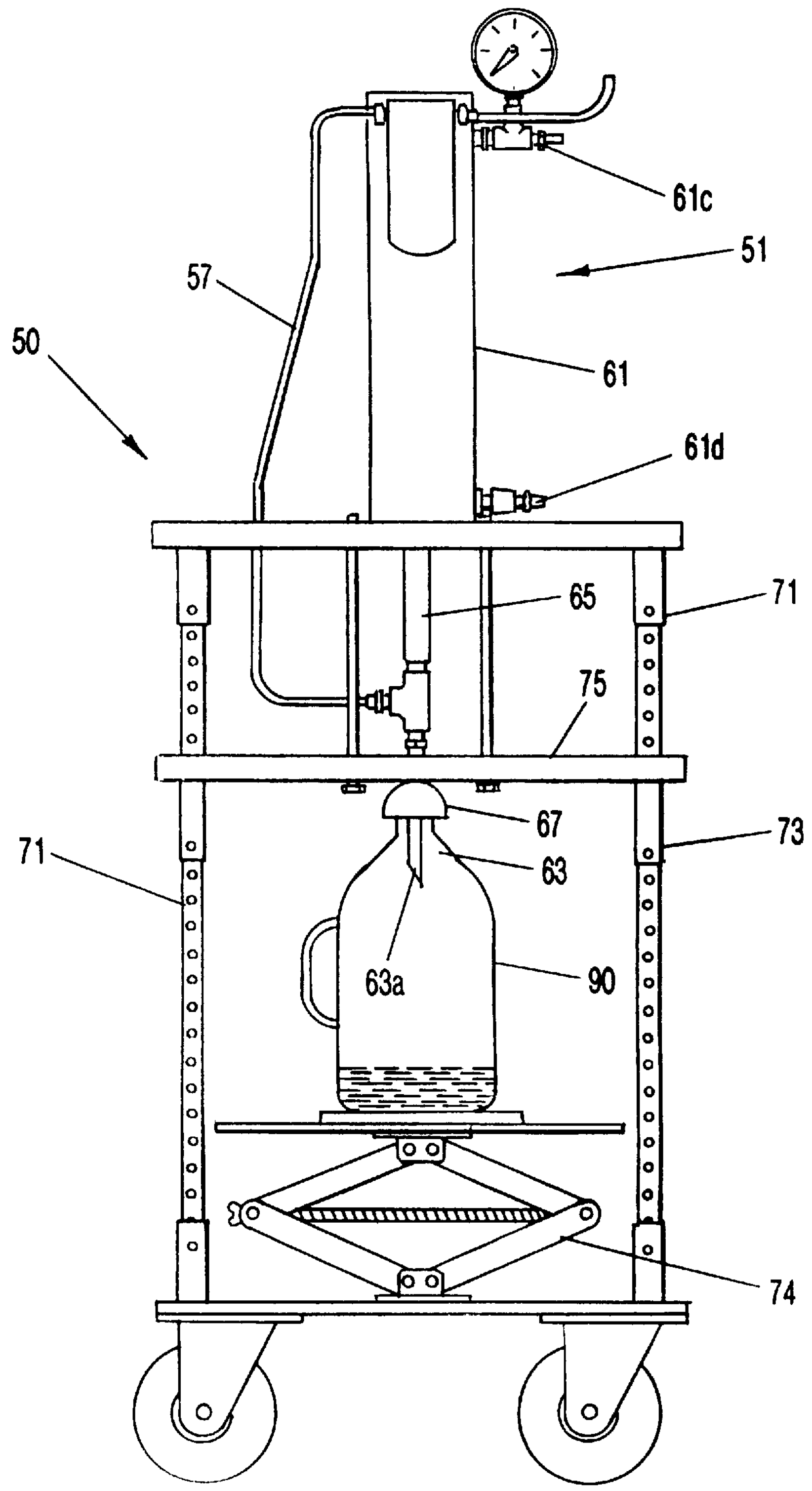
FIG. 5 is an alternate embodiment of the present invention.

An alternate embodiment 50 of the present invention is shown in FIG. 5. Embodiment 50 is directed toward sampling containers typically smaller than oil drums (such as a bottle having a lid or a like container) and which are capable of being moved in order to sample, test or vent. Embodiment 50 includes (a) compressed air means 51; (b) pneumatic cylinder 61; and adjustable rack 71. Pneumatic cylinder 61 is directly attached to shaft 65 within remote sampling device 50, and, similar to the earlier embodiment, sampling device 61 includes a hollow, sampling insertion needle 63 suspended thereon, insertion needle 63 being operable by pneumatic cylinder 61.

Remote sampling device 50 is securely attached to portable cart 73 by the use of any conventional method such as welding and includes adjustable rack 71. In most instances, persons involved with hazardous material (such as bomb squads, emergency response teams and chemical clean up crews) are equipped with compressed air cylinders and regulators. Therefore, any potentially hazardous bottles or small containers (such as bottle 90 having a lid as seen in FIG. 5) requiring sampling are placed on adjustable rack 71, the rack is then increased in height by any conventional means (such as scissor jack 74 as seen in FIG. 5) to meet hollow insertion needle 63, and air pressure from a compressed air cylinder (not shown) is introduced to control the insertion and extraction of insertion needle 63. Adjustable rack 71 is intended to allow an operator to make large adjustments for the size of bottles 90, and to allow for depth adjustment within bottles 90. Optionally, bottle guide 67 is attached to needle stop 75, and prevents the bottle 90 from tipping over, while keeping bottle 90 centered as insertion needle 63 pierces the bottle lid 91. A sealing gasket (not shown) placed inside bottle guide 67 provides a vapor tight seal to prevent the escape of vapors from bottle 90.

Similar to the embodiment described above, insertion needle 63 has a hollow, tapered open end 63*a*, where its hollow channel is in fluid communication with some predefined external source (such as inert gas, a chemical neutralizer or vacuum pump). As those of skill in the art will appreciate, this embodiment also allows for the opening, sampling and venting of small containers.

Whereas the drawings and accompanying description have shown and described the preferred embodiment of the present invention, it should be apparent to those skilled in the art that various changes may be made in the form of the invention without affecting the scope thereof.

I claim:

1. An apparatus for opening, sampling and venting any surface of an enclosed receptacle, where the contents of the receptacle are unknown or require verification, comprising:

a. air compression means attached to a portable vehicle;

b. a sampling device having a hollow sampling needle, the sampling device being secured to the receptacle by a securing means;

c. a means for communicating fluid flow attached between and being in fluid communication with the air compression means and the sampling device; and d. means surrounding and encapsulating the sampling device for containing hazardous material to within the immediate environment of the sampling device which allows for introduction of an inert gas for preventing ignition of the receptacle contents.

2. The apparatus as set forth in claim 1, wherein the compressed air means further comprises a compressed air tank, a means for regulating air pressure and a penetration indicator, the means for communicating air flow further comprises a plurality of hoses of predetermined length.

3. The apparatus as set forth in claim 2, wherein the sampling device further includes a pneumatic ram, a plurality of seals, a hollow sampling needle and a container securing means, the pneumatic ram being attached to and in fluid communication with the means for communicating fluid flow.

4. The apparatus as set forth in claim 3, wherein the means for regulating air pressure includes a pressure regulator and a control valve, the control valve having a first position for extending a pneumatic ram and a second position for retracting the pneumatic ram.

5. The apparatus as set forth in claim 3, further including a penetration indicator, and a reel, the reel disposed on the portable cart to retain, extend and retract a predetermined length of high pressure air line.

6. The apparatus of claim 3, wherein the hollow sampling needle is adapted to puncture and open a variety of containers from any surface of the container, the sampling means further including a pneumatic ram, a switch in electrical communication with the pneumatic ram, the switch adapted to close when it makes contact with a surface of the container, and wherein the plurality of seals resist chemical permeation and are adapted to prevent fluid emission from the container once opened.

7. The apparatus of claim 3 wherein the sampling device further includes a handle and a fitting disposed between and in fluid communication with the hollow sampling needle and the means for communicating fluid flow, and wherein the container securing means further comprises a plurality of straps adapted to retain the sampling device to the container, and further, including a base having a plurality of adjustable feet to secure the sampling device to any size container.

8. A apparatus for opening, sampling and venting a surface of an enclosed container having contents which are unknown or require verification, including:

a. a sampling device having a hollow sampling needle, the sampling device being secured to the container by a securing means;

b. a compressed air means attached to a portable vehicle, the compressed air means physically removed and remotely located from the sampling device to allow safe operation of the sampling device as it opens, samples or vents the container;

c. means surrounding and encapsulating the sampling device for containing hazardous material to within the immediate environment of the sampling device which allows for introduction of an inert gas for preventing ignition of the receptacle contents; and d. means to transport fluid flow which is attached between and being in fluid communication with the container and a containment vessel, pump or direct reading instrument.

9. The claim according to claim 8, wherein the compressed air means comprises at least one source of compressed gas, a gas regulator and a reel, all disposed on the portable vehicle.

10. The claim according to claim 9, wherein the sampling device is adapted to puncture and open the container from any container surface, and wherein the sampling device further includes a hydraulic ram adapted to apply sufficient pressure to allow the hollow sampling needle to puncture and open the container surface.

* * * * *